US012657215B2

(12) United States Patent
Prystupa et al.

(10) Patent No.: US 12,657,215 B2
(45) Date of Patent: Jun. 16, 2026

(54) UNIFIED DATA SIDE PANEL

(71) Applicant: Salesforce, Inc., San Francisco, CA (US)

(72) Inventors: Siarhei Prystupa, San Francisco, CA (US); Vandit Garg, San Francisco, CA (US); Rebecca Greenberg, San Francisco, CA (US); Christopher Bernt, San Francisco, CA (US); Jose Garcia, San Francisco, CA (US); Manish Sombansh, San Francisco, CA (US); Siddharth Patel Aka Khunt, San Francisco, CA (US); Shanti Camper Singh, Bellevue, WA (US); Varun Chandashekar, Bellevue, WA (US); Allen Wittman, San Francisco, CA (US); Patrick Felong, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 440 days.

(21) Appl. No.: 18/162,389

(22) Filed: Jan. 31, 2023

(65) Prior Publication Data

US 2024/0184808 A1      Jun. 6, 2024

(51) Int. Cl.
| | |
|---|---|
| *G06F 16/00* | (2019.01) |
| *G06F 16/25* | (2019.01) |
| *G06F 16/28* | (2019.01) |
| *G06F 16/958* | (2019.01) |

(52) U.S. Cl.
CPC .......... *G06F 16/287* (2019.01); *G06F 16/258* (2019.01); *G06F 16/958* (2019.01)

(58) Field of Classification Search
CPC ..... G06F 16/287; G06F 16/958; G06F 16/258
USPC ........................................................ 707/737
See application file for complete search history.

(56) References Cited

U.S. PATENT DOCUMENTS

| | | | | |
|---|---|---|---|---|
| 8,296,664 | B2 * | 10/2012 | Dixon | G06F 21/44 |
| | | | | 715/760 |
| 9,535,967 | B2 | 1/2017 | Pragides et al. | |
| 10,567,311 | B2 | 2/2020 | Yip et al. | |
| 10,681,499 | B2 | 6/2020 | Padovani et al. | |
| D921,014 | S | 6/2021 | Garg et al. | |
| 11,030,082 | B1 | 6/2021 | Ma et al. | |
| D924,901 | S | 7/2021 | Garg et al. | |
| 11,075,863 | B2 | 7/2021 | Yip et al. | |
| 11,509,608 | B2 | 11/2022 | Greenberg et al. | |
| 11,539,652 | B2 | 12/2022 | Greenberg et al. | |
| 11,960,977 | B2 * | 4/2024 | Kumar | G06F 16/953 |
| | | | | 707/707 |
| 2009/0083113 | A1 * | 3/2009 | Ortega | G06Q 40/06 |
| | | | | 705/35 |
| 2011/0276396 | A1 * | 11/2011 | Rathod | H04L 51/214 |
| | | | | 707/706 |
| 2021/0149953 | A1 | 5/2021 | Garg et al. | |

(Continued)

*Primary Examiner* — Alexandria Y Bromell
(74) *Attorney, Agent, or Firm* — Polygon IP, LLP

(57) ABSTRACT

Systems and techniques are described for a unified data pipeline interface. The pipeline interface provides an interface illustrating key metrics, activities, insight, and/or other categories. The pipeline interface provides such data as to a specific opportunity. The systems and techniques described herein allow for the determination, presentation, and standardization of such data through a specifically configured graphical user interface.

14 Claims, 13 Drawing Sheets

(56)  References Cited

U.S. PATENT DOCUMENTS

| | | | |
|---|---|---|---|
| 2021/0320892 A1 | 10/2021 | Greenberg et al. | |
| 2022/0113949 A1* | 4/2022 | Geoffroy | G06F 8/36 |
| | | | 707/707 |

* cited by examiner

300

| User Device 302 | Browser 304 | UI 306 | API 308 | Server 310 |

500

600

800

Log upcoming activity

__Log a Call__        New Event        New Task        Email

Subject

Call                                                              🔍

Comments

Due date                              Related to

10/16/2020                            🖾 Lancaster Promo NB

Cancel        Save

1300

1302

1304

UNIFIED DATA SIDE PANEL

CROSS-REFERENCE TO RELATED APPLICATIONS

This application claims priority to Provisional U.S. Patent App. No. 63/386,157, filed Dec. 5, 2022, by Siarhei Prystupa et al., which is hereby incorporated by reference in its entirety and for all purposes.

COPYRIGHT NOTICE

FIELD OF TECHNOLOGY

This patent document relates generally to standardizing and providing pipeline data and more specifically to an API that standardizes data from a plurality of sources and provides the data through a specifically configured graphical user interface.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Typically, teams manipulate data via spreadsheets and other manual techniques. Such techniques consume data in a manner that does not allow for granular visibility into the details of the data.

BRIEF DESCRIPTION OF THE DRAWINGS

The included drawings are for illustrative purposes and serve only to provide examples of possible structures and operations for the disclosed inventive systems, apparatus, methods and computer program products for standardizing data shape for use in a side panel graphical user interface configured to display pipeline steps. These drawings in no way limit any changes in form and detail that may be made by one skilled in the art without departing from the spirit and scope of the disclosed implementations.

DETAILED DESCRIPTION

Typically, spreadsheets are used to provide data to users. Such spreadsheets tend to be part of larger quantities of data transferred to or received from another source (e.g. a "data dump" or a mass dump of data). The spreadsheet may include data directed to a plurality of different aspects, such as a plurality of different deals for a spreadsheet configured to provide data for deal pipelines. In such an example, spreadsheets do not provide granular visibility into the details of individual deals or categories. The lack of granular detail results in users spending more time in trying to ascertain certain information from the spreadsheet.

Described herein are systems and techniques for providing a unified data pipeline interface. The pipeline interface provides an interface illustrating key metrics and categories in one single view. The pipeline interface provides such data as to a specific opportunity, for example, a business opportunity with a potential customer. The systems and techniques, including the improved graphical user interface (GUI), described herein allow for the determination and presentation of insights as to the opportunity, allowing the user to obtain specific data that can be acted upon.

Figure 1:
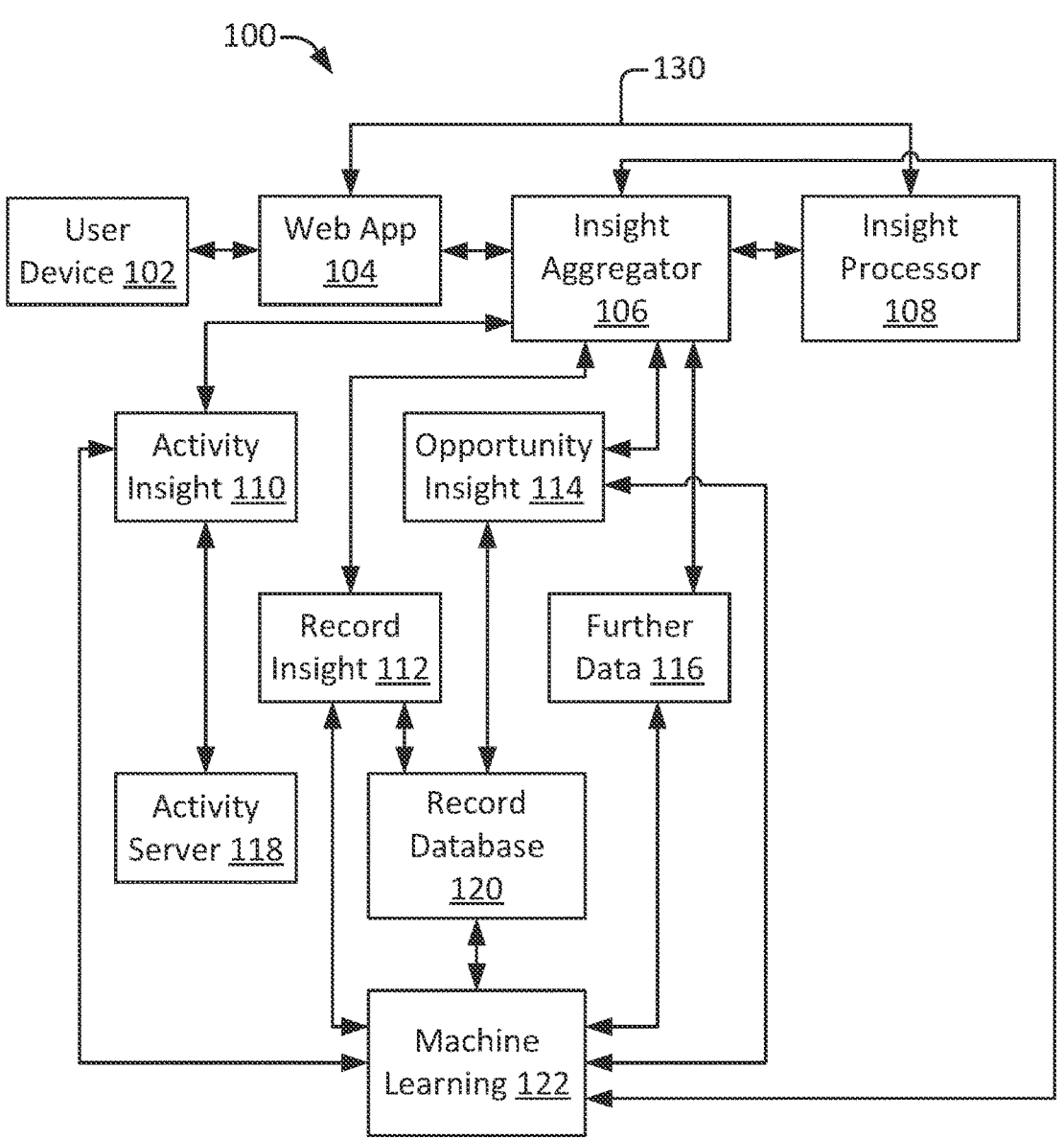
FIG. 1 illustrates an example of an arrangement of components in a computing system, configured in accordance with one or more embodiments.

FIG. 1 illustrates an example of an arrangement of components in a computing system, configured in accordance with one or more embodiments. FIG. 1 illustrates system 100. System 100 includes user device 102, web application 104, insight aggregator 106, insight processor 108, activity insight 110, record insight 112, opportunity insight 114, further data 116, activity server 118, record database 120, and machine learning module 122. The various components of system 100 are communicatively coupled via communications channels 130. Communications channels 130 may be any type of wired and/or wireless communication technique.

User device 102 may be any device utilized by users for the techniques described herein. Such a device may be, for example, a smartphone, wearable device, laptop computer, desktop computer, and/or another such electronic device that may provide data to a user and receive input from a user.

Web application 104 may be an application configured to communicate data to the user and receive inputs from the user. In various embodiments, web application 104 may be accessed by user device 102. Web application 104 may be an application accessed online (e.g., through a web browser or application), through an application stored on user device 102, and/or through another such technique. Web application 104 may be configured to receive inputs from the user and to provide data to the user (e.g., through a graphical user interface).

Web application 104 may be configured to receive data from insight aggregator and insight processor 108. Insight aggregator 106 may be configured to receive data from various sources such as activity insight 110, record insight 112, opportunity insight 114, and further data 116 and provide data to web app 104 and insight processor 108. In various embodiments, such data may be, for example, insights that are determined through various techniques. In certain embodiments, the insights may be determined through machine learning (e.g., by machine learning module 122). Alternatively or additionally, the insights may be determined by insight aggregator 106 and/or insight processor 108 through accessing of the data of various databases and applying rules to the data.

In various embodiments, insight aggregator 106 may be configured to receive data of various different formats and aggregate data of disparate formats into a single format for display within web application 140. For example, activity insight 110, record insight 112, opportunity insight 114, and further data 116 may each be of a different format of data. For example, record insight 112 may be data in the form of various documents such as spreadsheets, word document, presentation, and/or other such appropriate data types. Such data types may be data from various data sources and other systems. Activity insight 110 may be data in the form of activities of the user, such as calls, e-mails, messages, recordings, and other such data formats. Opportunity insight 114 may be, for example, outputs from machine learning devices and/or data files showing ratings for various opportunities. Insight aggregator 106 may receive each such data file, standardize the data into a single format, determine a presentation format of insights from data of the standardized format, and provide such data to web application 104 for display on a GUI of user device 102. Activity insight 110 may be insights based on the activity of the user. The activity may be stored as activity data within activity server 118. Such activity may be, for example, calls, e-mails, messages, recordings, and/or other such actions performed by the user and/or entities (e.g., persons) associated with the user, such as team members of the user. Activity insight 110 may, in certain embodiments, be determinations of agreements, future actions to be performed, follow-ups, and/or other items that may be associated with a transaction. Activity insight 110 may be determined from, for example, text recognition software parsing textual documents, voice recognition software parsing through videos and/or recording, data contained within calendars, and/or other such techniques.

In various embodiments, such techniques may allow for the conversion of data of activity server 118 into a standardized format. In certain embodiments, the base data that insights are determined from may be of a different format than the output from the various determined insights. Thus, for example, the software described herein may convert each type of data into a text transcript for analysis. Machine learning, artificial intelligence, or rules based techniques may then analyze the text transcript to determine insights. The insights may be output as a common data format. Accordingly, in certain embodiments, activity insight 110 may receive non-standard data and output standardized data to insight aggregator 106. Similar techniques may be utilized by record insight 112, opportunity insight 114, further data 116, and other such components. As such, in certain embodiments, the standardization of the data may be performed by activity insight 110, record insight 112, opportunity insight 114, and/or further data 116 alternative or additional to that of insight aggregator 106.

Record insight 112 may be insights from records stored within databases, such as record database 120. Record database 120 may be configured to store data directed to records (e.g., documents, recordings, video, and/or other such records) generated from various transactions and/or sales pipelines. Thus, for example, pursuit of a sales opportunity may lead to generation of records and such records may be stored within record database 120. Record insight 112 may be, for example, the determination of agreements, future actions to be performed, follow-ups, and/or other items determined through analysis of data within record database 120. In certain embodiments, such insights may be determined by through various techniques described herein, such as techniques similar to the determination of activity insight 110 and/or with machine learning module 122. For example, records may be kept or converted to text and machine learning, artificial intelligence, or rules based techniques may then analyze the text to determine insights. Thus, machine learning module 122 may be trained accordingly to determine such insights.

Opportunity insight 114 may be, for example, a determination of whether an opportunity is worth pursuing. Thus, for example, the likely pay-off (e.g., project or account value), complication (e.g., to close or fulfill), potential legal liability, competition, and/or other aspects of the opportunity may allow for a determination of the worth of an opportunity (e.g., whether the opportunity should be a high, medium or low priority). Opportunity insight 114 may be determined from the data of record database 120 and may, in certain embodiments, be determined by machine learning module 122.

For example, in various embodiments, record database 120 may include data associated with the laws of various areas, the revenue and/or profit of certain projects and the characteristics of the projects, whether a proposal or bid succeeded or was rejected and the characteristics of the proposal or bid, various timelines to acceptance or success, and/or other such data. In certain embodiments, such records may be formal documents such as a word documents, spreadsheets, accounting files, e-mails, and/or other such data. The data may be standardized according to the techniques described herein. The standardized data may then be analyzed to determine opportunity insight 114.

For example, the various characteristics of an opportunity may be determined from the records according to the techniques described herein. The characteristics of the opportunities may be associated with whether the opportunity was a success or failure, the payout of the opportunity, and the timeline. Various factors (e.g., likelihood of success, payout, length of time to pursue the opportunity, and resources expended in pursuit of the opportunity) may be weighted and an opportunity insight 114 may be accordingly determined. In certain embodiments, opportunity insight 114 may be determined by, for example, machine learning module 122, rules based techniques, or other techniques described herein.

Further data 116 may be one or more additional sources of data that may provide for insights, and/or indications. Further data 116 may, for example, include data generated from sources such as third parties. Accordingly, in a certain example, further data 116 may include external data indicating the success rates for pursuing various types of opportunities.

In various embodiments, insight aggregator 106 may be configured to receive insights determined from the various insight providers and provide such insights to insight processor 108. Insight processor 108 may be configured to categorize and/or prioritize insights for display on the GUI of web application 104. Insight processor 108 may prioritize different insights into various categories. Thus, insight processor 108 may receive insights from insight aggregator 106 and categories the insights, determine an order for display of the insights on a GUI, format the insights for display on the GUI, output one, some, or all of the insights to insight aggregator 106 and/or web application 140 for display on the GUI (e.g., in certain embodiments, only the insights that are to be displayed may be provided to the GUI, to conserve processing and network resources), and/or perform other such actions.

Furthermore, insight processor 108 may be configured to receive data related to various actions (e.g., activities or records) associated with an opportunity. Insight processor 108 may be configured to associate the actions to insights, for display on the GUI of web application 104. In certain embodiments, the various forms of data and insights may be of disparate data shapes. Insight aggregator 106 may be configured to unify such data shapes to that of a standard shape, so that the various data and insights may be processed by insight processor 108.

Furthermore, insight processor 108 may be configured to order the various insights received into a display order. The order may be based on one or more rules and/or priorities (e.g., order rules stored within record database 120). Thus, for example, the most important insight to close a deal may be assigned the highest priority. Insight processor 108 may, in certain embodiments, be configured to determine the priority order of the various insights. In various examples, certain types of insights may be prioritized. Variously, certain insights may include a due date and certain embodiments may prioritize insights with close upcoming due dates. Alternatively or additionally, determination of the insights may include a determination of the importance of the insights to the pursuit of an opportunity. Such a determination may be through machine learning, through various rules, and/or other such techniques described herein. In certain embodiments, data generating the insights may be parsed and, for example, certain keywords such as "urgent," "required," "promise," and/or other such keywords indicating actions that must be performed may be determined. Such keywords may increase the priority rating (e.g., allow for a higher priority of display on the GUI) of the associated insight. Based on the determined order, the insight and order may be communicated to web application 104, for display of the insights and/or actions according to the determined order.

Machine learning module 122 may be a machine learning module that may be trained to perform various portions of the technique described herein. The machine learning module 122 may, for example, be trained to determine various insights and/or the presentation order of the insights on the GUI of user device 102. Machine learning module 122 may include a processor, memory, neural network, and/or other such device that may be trained and may perform various determinations.

Figure 2:
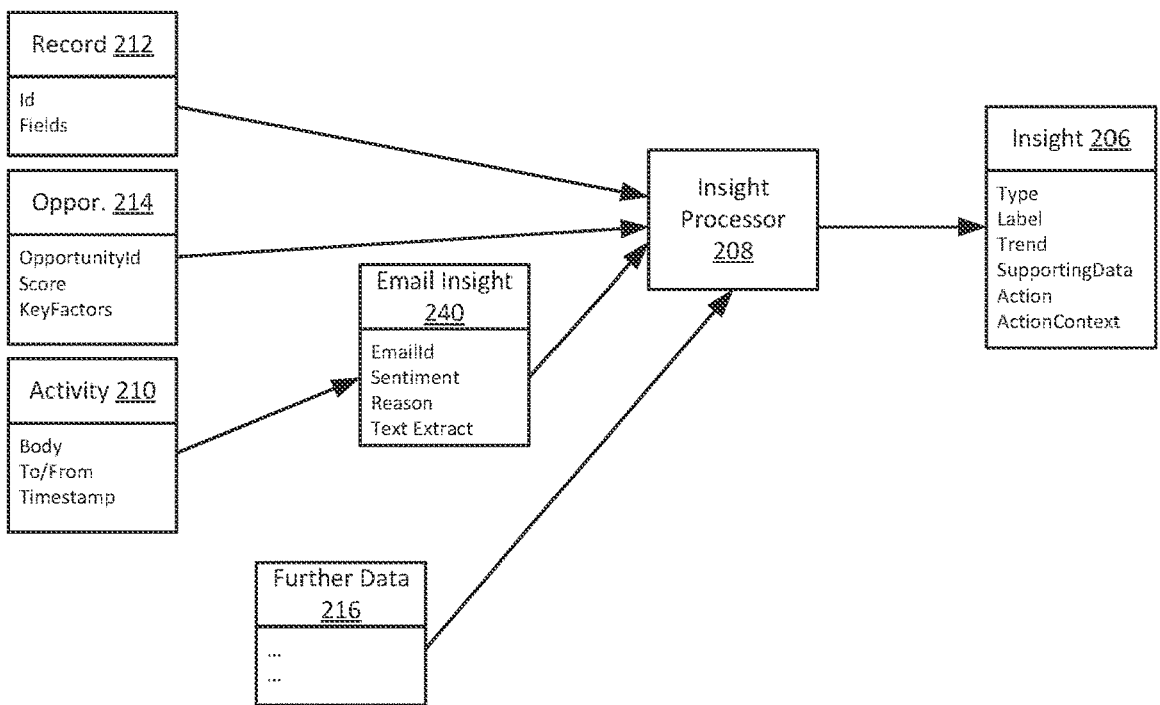
FIG. 2 illustrates an example of a data insight system, configured in accordance with one or more embodiments.

FIG. 2 illustrates an example of a data insight system, configured in accordance with one or more embodiments. FIG. 2 illustrates data insight system 200 that allows for the determination of insight 206. Insight 206 may be insights determined according to the techniques described herein and communicated to a web application for display on a GUI.

Data insight system 200 may illustrate example data elements that may allow for the determination of various insights. Such data elements may include, for example, activity 210, record 212, opportunity 214, and further data 216.

Activity 210 may be data generated by activity performed by one or more entities associated with the opportunity.

Thus, for example, activity 210 may include data generated by activities such as e-mails, calls, messages, recordings, and/or other such communications. Such activities may lead to the creation of records and/or other data that may be parsed with audio, video, and/or text recognition techniques to determine various insights. Thus, for example, in various techniques, the originator and/or recipient of a message, metadata such as the timestamp (e.g., when the message was sent or when a call or recording was performed), and the body of the communications may be parsed to determine various insights. Such insights may include, for example, the originator or recipient (e.g., determined from the metadata of an e-mail or from voice and/or facial recognition of a call or video and allowing for a determination of the priority of the message), the timetable for any agreements, the likelihood that the communications includes a current agreement (e.g., whether it has been superseded or not), next steps to be taken (e.g., determined from the body of the communications, such as the body of the e-mail or the recording of a call), and other such insights.

In certain embodiments, such as when activity 210 pertains to an e-mail, email insight 240 may parse the e-mail to determine various insights. Such insights may include, for example, the e-mail ID, the sentiment of the e-mail (e.g., whether it is labeled as urgent, the tone of the e-mail title and/or body, and/or other such aspects of the e-mail), the reason for the e-mail, any commands, requests, requests, and/or other aspects communicated within the body of the e-mail, and/or other such aspects. Such aspects may be determined through analysis of the metadata of the e-mail and/or through text recognition by extracting text from the title and/or body of the e-mail. Accordingly, email insight 240 may be configured to determine various details of the emails and output the details in a standard data format for use as insights.

Record 212 may be data directed to various records stored within one or more databases and may include, for example, the record ID and data directed to entries within the various fields of a record. Such fields may be fields that are automatically or manually filled out. Data of record 212 may be determined by, for example, text recognition techniques that may parse the record and determine insights from the record.

Opportunity 214 may be, for example, a determination of whether an opportunity is worth pursuing. Such a determination may be according to the factors described herein. Opportunity 214 may be configured to, for example, be associated with an opportunity ID (e.g., the ID of an opportunity, which may also be associated with all other insights of the specific opportunity), an opportunity score, key factors of the opportunity (e.g., aspects that need to be met to obtain the opportunity, risks of the opportunity, and/or other such aspects of the opportunity). Such aspects may allow for the classification of the opportunity. In various embodiments, opportunity 214 may include an opportunity score that is determined through various techniques described herein, such as via machine learning, through algorithmic techniques, manually, and/or through other such techniques.

Further data 216 may be additional data that may provide for additional insights. The various insights described herein may be provided to insight processor 208, which may be configured to determine insight 206. Insight processor 208 may determine various aspects and/or comparisons of the insights. For example, insight processor 208 may be configured to receive the various non-standardized data formats of record 212, opportunity 214, activity 210, further data 216, and/or email insight 240 and convert such data into a standardized data format. Thus, insight processor 208 may, for example, receive such data and populate a standard format data structure with the received data. Such a data format may, in certain embodiments, include a section for attachments or external links, for situations where a recording, video, other multimedia, and/or other file needs to be provided. Such attachments may, accordingly, be linked or provided as a part of the display of the insight on the GUI.

In certain embodiments, insight processor 208 may compare and classify the various insights. For example, insight processor 208 may determine a presentation order for the various insights received. Thus, for example, the type of insight, the type of the opportunity, various labels or categories of the insight, the trends associated with the insight, data supporting an insight (e.g., supporting the classification or actions to close the opportunity), the actions needed (e.g., to close the opportunity), the context of the actions (e.g., timing, parties involved, urgency, and/or other such aspects), and/or other elements may be determined as insight 206. Insight 206 may then be provided for classification and comparison between a plurality of other insights and then accordingly displayed within a GUI, according to the techniques described herein.

Figure 3:
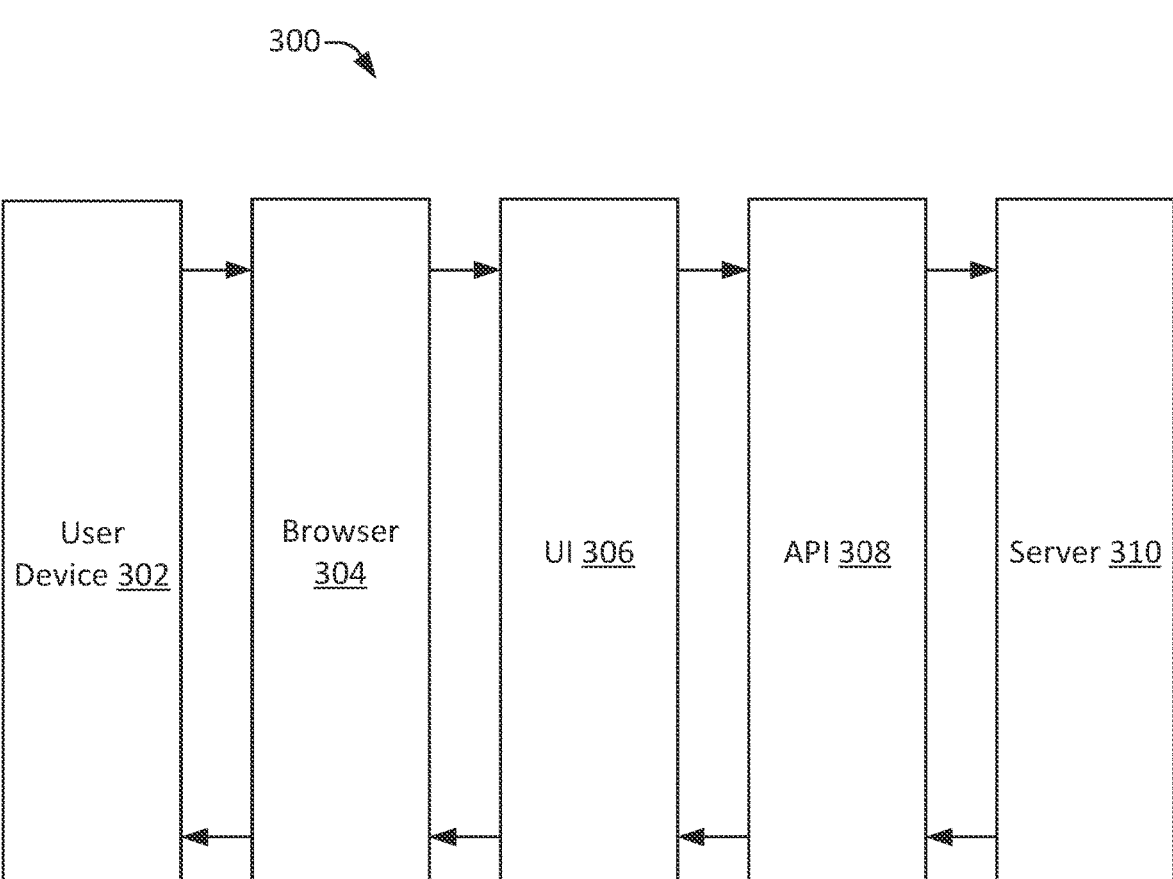
FIG. 3 illustrates an example of system pipeline, configured in accordance with one or more embodiments.

FIG. 3 illustrates an example of system pipeline, configured in accordance with one or more embodiments. System 300 of FIG. 3 illustrates the flow of data between various systems for the techniques described herein. Thus, in system 300, user device 302 first accesses browser 304, which loads a GUI or portion thereof. The GUI may include an insight tab, an activity tab, a timeline, metrics, and/or other data associated with one or more opportunities. The GUI may be configured to receive one or more instructions from the user of user device 302.

Browser 304 may query UI 306 to obtain such aspects. Thus, for example, browser 304 may query UI 306 to obtain one or more tabs, timelines, and/or metrics. UI 306 may, in certain embodiments, be a plug-in or application associated with browser 304. Browser 304 may accordingly access or load UI 306 when user device 302 requests loading of the GUI or portion thereof.

UI 306 may connect with API 308 to obtain the data for the one or more tabs, timelines, and/or metrics. API 308 may allow for UI 306 to connect with server 310 to obtain one or more insights, data and/or other aspects for display on the GUI. Server 310 may include one or more databases, machine learning modules, activity server, and/or other components. The databases of server 310 may be configured to obtain data from a plurality of sources, as described herein. Such components may provide the data and/or insights that may be configured to be displayed within one or more GUIs. API 308 may accordingly access server 310 and provide such data and/or insights to UI 306. UI 306 may provide the data and/or insights to browser 304, for rendering by browser 304. The GUI may then accordingly be presented on user device 302.

Figure 4:
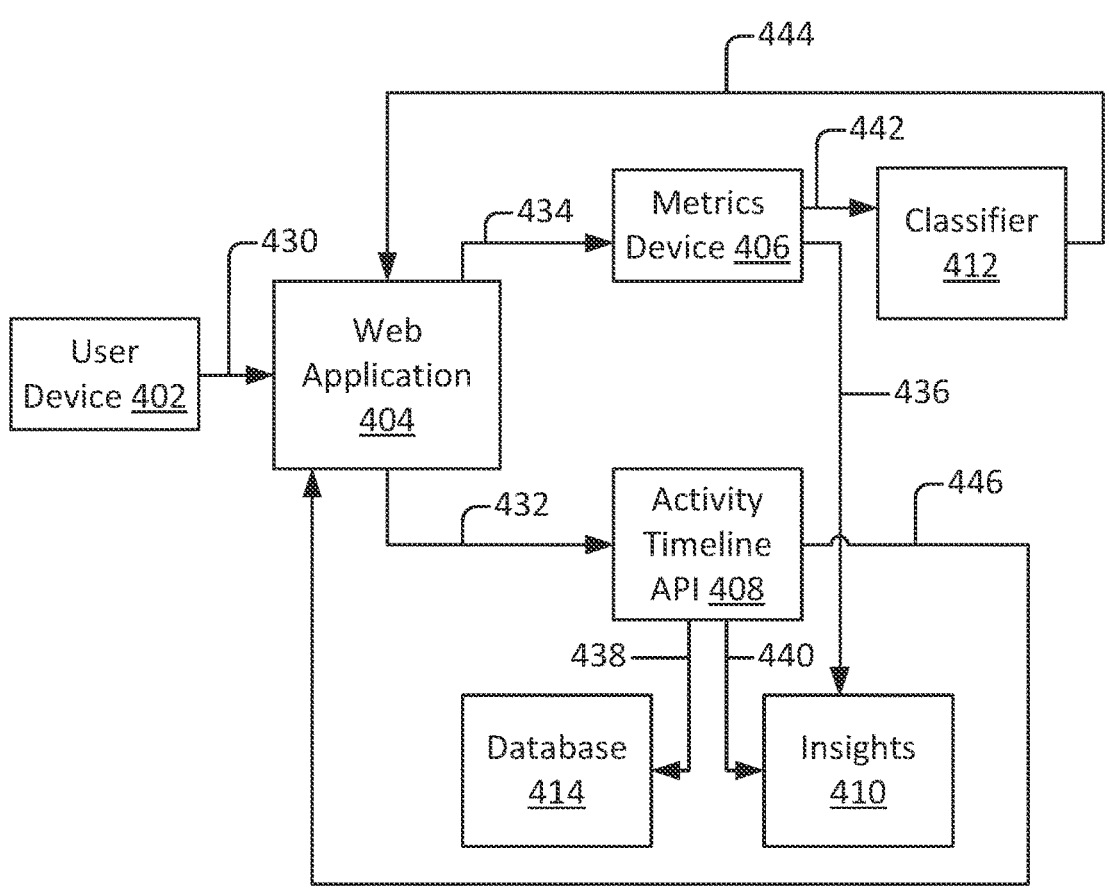
FIG. 4 illustrates another example of a data insight system, configured in accordance with one or more embodiments.

FIG. 4 illustrates another example of a data insight system, configured in accordance with one or more embodiments. FIG. 4 illustrates system 400 that is configured to receive data from a plurality of sources in a plurality of non-standard data formats, standardize the format of the data, and determine and provide insights to a GUI, as described herein. FIG. 4 illustrates the flow of data within system 400 to perform the techniques described herein.

User device 402 may be an electronic device as described herein. Web application 404 may be an application within a web browser and may be loaded by user device 402. Thus, in 430, user device 402 may provide a request to display a GUI that provides information (e.g., past opportunities, metrics, and/or other data) and/or insights into one or more opportunities.

In 432, web application 404 may request data and/or insights from activity timeline API 408. Web application 404 may provide such a request when a GUI is loaded within web application 404, and/or at times before the command to load the GUI is received. Activity timeline API 408 may respond to such requests and access database 414 and determine insights 410 in 438 and 440, respectively. In various embodiments, activity timeline API 408 may authenticate and/or determine the identity of the user providing the request (e.g., through the user's log-in into an account that then loads web application 404) and access database 414 and/or determine insights 410 according to the user's identity.

Database 414 may be one or more databases as described herein. Database 414 may include data that is received from a plurality of sources and/or in a plurality of different formats. Data within database 414 may be periodically or regularly updated. Database 414 may be structured to include separate databases for different types of data, allowing for simpler access and searching between databases due to the delineation. Furthermore, while various other components are described herein as configured to perform standardization of data, it is appreciated that database 414 may also perform such techniques.

Insights 410 may be determined from device described herein according to the techniques described herein. Activity timeline API 408 may communicate such data and/or insights accessed from database 414 and/or determined as insights 410 to web application web application 404.

Based on the request, web application 404 may fetch activity metrics associated with the opportunity in 434 from metrics device 406. Metrics device 406 may be a device configured to determine and/or provide activity metrics associated with the opportunity. For example, metrics device 406 may access data indicating or determine (through data) the likelihood of success of the opportunity or similar opportunities (e.g., opportunities with similar characteristics). Alternatively or additionally, metrics device 406 may be configured to determine the likely value of an opportunity, the amount of effort typically required to close such an opportunity, the typical time required to close such an opportunity, and/or other such metrics. In certain embodiments, metrics device 406 may be a database, machine learning device, an electronic device processing various rules, and/or other such device. In certain embodiments, metrics device 406 may access insights 410 in 436 to obtain insights for display on the GUI, as well as access and/or provide metrics.

The data and insights may be provided to classifier 412 in 442. Classifier 412 may be a processor configured to receive data and insights and divide such data and insights into a plurality of different categories (e.g., all activities, meetings, calls, e-mails sent, e-mails received, recordings, and/or other such categories). Furthermore, classifier 412 may be configured to determine an order for display on the GUI for the various insights, data, metrics, and other components. The order and categories of the data and insights may then be communicated to web application 404 in 444. Web application 404 may then accordingly display the data and insights according to the classification provided by classifier 412.

FIGS. 5-8 illustrate examples of graphical user interfaces, configured in accordance with one or more embodiments. Variously, FIGS. 5-8 illustrate examples of GUIs for presenting data and/or insights.

Figure 5:
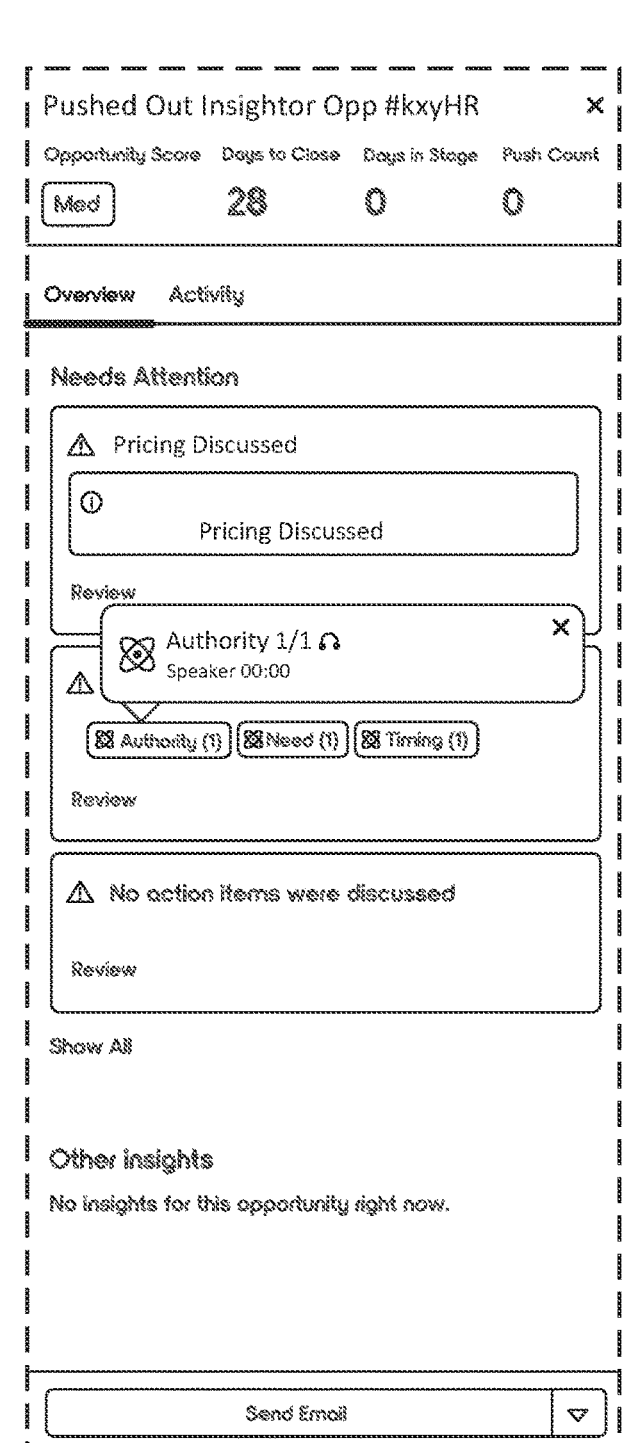
FIGS. 5-8 illustrate examples of graphical user interfaces, configured in accordance with one or more embodiments.

FIG. 5 illustrates GUI 500 that is a sidebar GUI illustrating four key metrics and an overview tab with the three most important items needing attention shown. The embodiment of GUI 500 shown in FIG. 5 may be a sidebar GUI showing insights for a specific opportunity. The items may be displayed according to their priority. In various embodiments, the items may be insights determined according to the techniques described herein. The insights may be directed to insights determined from the data stored within the databases and may include actions that need to be taken by a user (e.g., actions associated with an opportunity). In certain embodiments, the insights may be displayed according to an order. Such an order may be determined by, for example, determining the insights that are the most important for closing or securing the specific opportunity.

Figure 6:
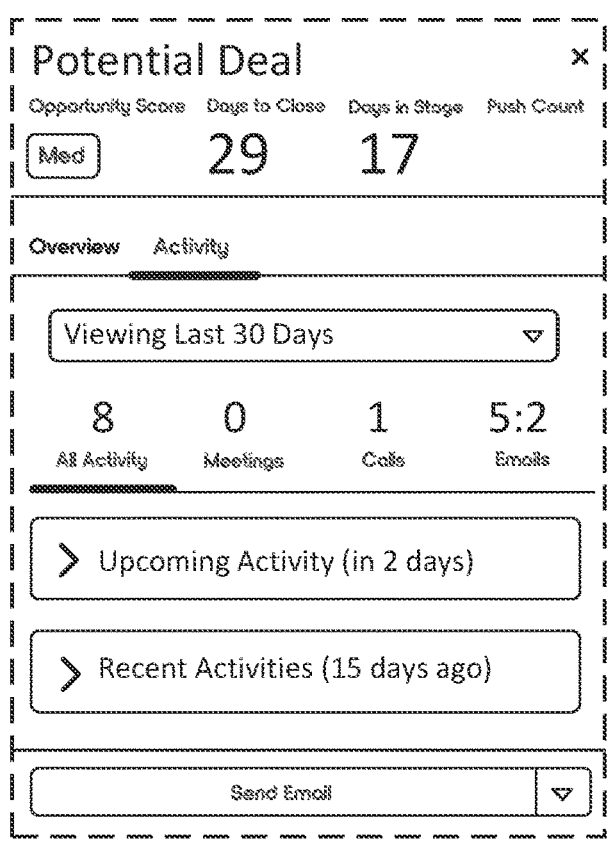

FIG. 6 illustrates GUI 600 that is a sidebar illustrating key metrics and an activity tab illustrating various activities associated with an opportunity performed by a party, within a threshold timeframe.

Figure 7:
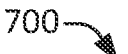
Figure 7:
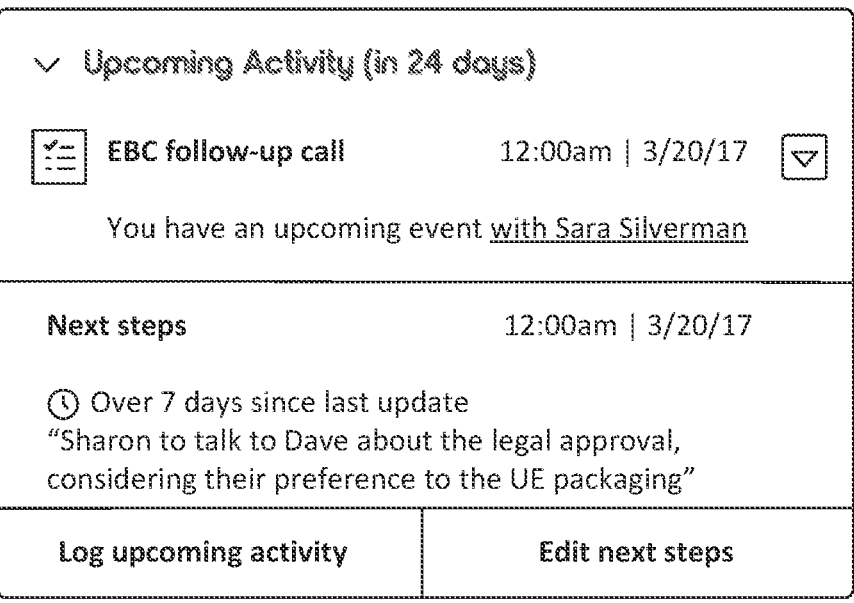

FIG. 7 illustrates GUI 700 that is an activity tab that indicates upcoming activities and the next steps needed for the activity. GUI 700 includes an option to log the upcoming activities. Logging the activities may allow for data to be generated that may then be analyzed for insights.

Figure 8:
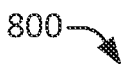

FIG. 8 illustrates GUI 800 that is a tab that allows for the logging of an upcoming activity. GUI 800 may illustrate the logging of an upcoming call. Such logging may, thus, log the audio data of the call, as well as allow a user to provide notes and other information associated with the call.

Figure 9:
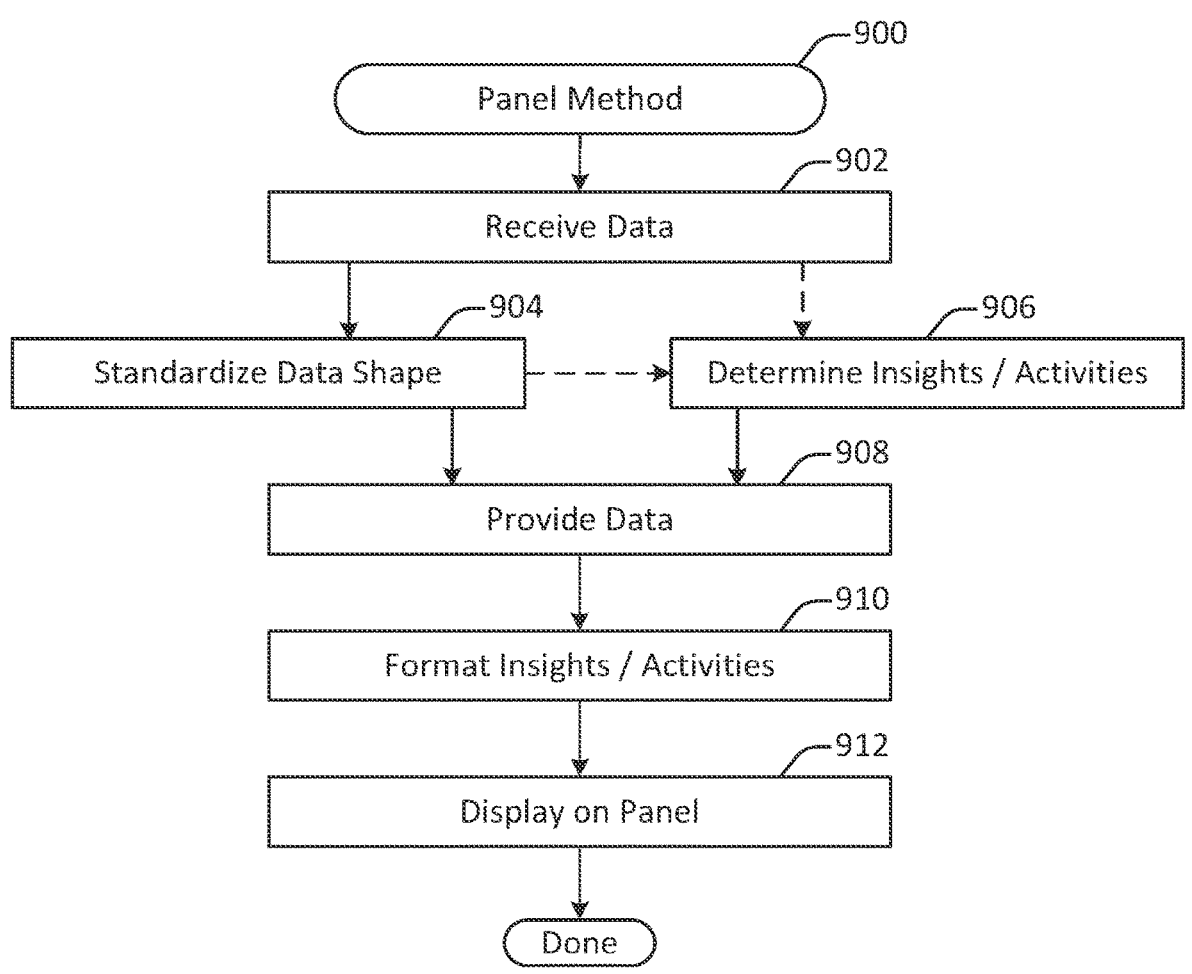
FIG. 9 illustrates an example of a method for configuring an insight panel, performed in accordance with one or more embodiments.

FIG. 9 illustrates an example of a method for configuring an insight panel, performed in accordance with one or more embodiments. FIG. 9 illustrates panel method 900 that allows for the display of insights on a GUI (e.g., a side panel). In 902, data is received from one or more databases. The data may include indications of opportunities, tasks, deadlines, agreements, and/or other aspects of an opportunity.

In 904, the data shape of the data may be standardized. That is, in certain embodiments, a single opportunity may include a plurality of different forms of data with different data shapes. For example, the opportunity may include e-mails, calls, recordings, calendar invites, to-do lists, and other such data. Each data may be of its own shape and format. 904 may utilize the techniques described herein, such as text recognition, voice recognition, and/or other such aspects, to standardize data shape to that of a data shape that is appropriate for presentation on a GUI.

Standardization of data shape may include, for example, classification of the data into one or more categories, indicating whether the data includes insights, opportunities, to-do items, and/or other such standard indications, generating data indicating the details of the indications, and/or other such aspects so that the data may be stored and may be searchable within a database.

Before, after, or concurrently with 904, insights and/or activities (e.g., previously performed activities by one or more parties) may be determined from the data in 906. Such insights or activities may be determined based on the techniques described herein. In certain embodiments, the insights and/or activities may be determined at the same time that the data shaped is standardized, in 904, or after the data has been standardized in 904.

In 908, the standardized data may be provided (e.g., to an application for display within a GUI). The data may include the insight or activities determined (e.g., within 906). The insights and/or activities may be formatted in 910. Such formatting may include, for example, comparing and/or ranking individual insights and/or activities to that of other insights and/or activities. Based on such formatting, the insights and/or activities to be displayed within the GUI may be selected and ordered. The insights and/or activities may then be accordingly displayed on the GUI (e.g., side panel) in 912.

Figure 10:
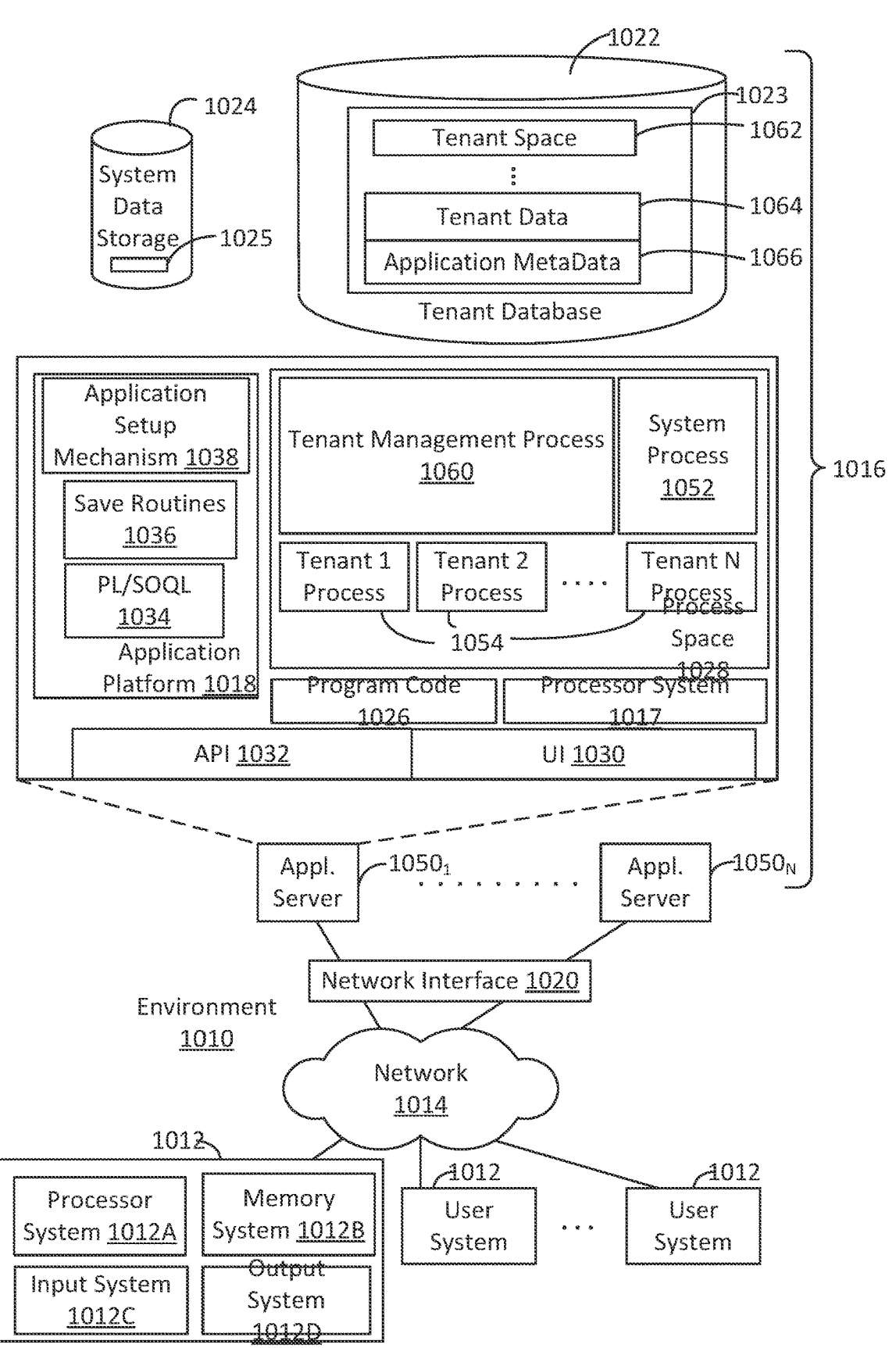
FIG. 10 shows a block diagram of an example of an environment that includes an on-demand database service, configured in accordance with some implementations.

FIG. 10 shows a block diagram of an example of an environment 1010 that includes an on-demand database service configured in accordance with some implementations. Environment 1010 may include user systems 1012, network 1014, database system 1016, processor system 1017, application platform 1018, network interface 1020, tenant data storage 1022, tenant data 1023, system data storage 1024, system data 1025, program code 1026, process space 1028, User Interface (UI) 1030, Application Program Interface (API) 1032, PL/SOQL 1034, save routines 1036, application setup mechanism 1038, application servers 1050-1 through 1050-N, system process space 1052, tenant process spaces 1054, tenant management process space 1060, tenant storage space 1062, user storage 1064, and application metadata 1066. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1016, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1018 may be a framework that allows the creation, management, and execution of applications in system 1016. Such applications may be developed by the database service provider or by users or third-party application developers accessing the service. Application platform 1018 includes an application setup mechanism 1038 that supports application developers' creation and management of applications, which may be saved as metadata into tenant data storage 1022 by save routines 1036 for execution by subscribers as one or more tenant process spaces 1054 managed by tenant management process 1060 for example. Invocations to such applications may be coded using PL/SOQL 1034 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1066 for a subscriber making such an invocation. Such system processes may also manage execution of application metadata 1066 as an application in a virtual machine.

In some implementations, each application server 1050 may handle requests for any user associated with any organization. A load balancing function (e.g., an F5 Big-IP load balancer) may distribute requests to the application servers 1050 based on an algorithm such as least-connections, round robin, observed response time, etc. Each application server 1050 may be configured to communicate with tenant data storage 1022 and the tenant data 1023 therein, and system data storage 1024 and the system data 1025 therein to serve requests of user systems 1012. The tenant data 1023 may be divided into individual tenant storage spaces 1062, which can be either a physical arrangement and/or a logical arrangement of data. Within each tenant storage space 1062, user storage 1064 and application metadata 1066 may be similarly allocated for each user. For example, a copy of a user's most recently used (MRU) items might be stored to user storage 1064. Similarly, a copy of MRU items for an entire tenant organization may be stored to tenant storage space 1062. A UI 1030 provides a user interface and an API 1032 provides an application programming interface to system 1016 resident processes to users and/or developers at user systems 1012.

System 1016 may implement a web-based unified data side panel GUI system. For example, in some implementations, system 1016 may include application servers configured to implement and execute unified data side panel GUI software applications. The application servers may be configured to provide related data, code, forms, web pages and other information to and from user systems 1012. Additionally, the application servers may be configured to store information to, and retrieve information from a database system. Such information may include related data, objects, and/or Webpage content. With a multi-tenant system, data for multiple tenants may be stored in the same physical database object in tenant data storage 1022, however, tenant data may be arranged in the storage medium(s) of tenant data storage 1022 so that data of one tenant is kept logically separate from that of other tenants. In such a scheme, one tenant may not access another tenant's data, unless such data is expressly shared.

Several elements in the system shown in FIG. 10 include conventional, well-known elements that are explained only briefly here. For example, user system 1012 may include processor system 1012A, memory system 1012B, input system 1012C, and output system 1012D. A user system 1012 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1012 to access, process and view information, pages and applications available from system 1016 over network 1014. Network 1014 may be any network or combination of networks of devices that communicate with one another, such as any one or any combination of a LAN (local area network), WAN (wide area network), wireless network, or other appropriate configuration.

The users of user systems 1012 may differ in their respective capacities, and the capacity of a particular user system 1012 to access information may be determined at least in part by "permissions" of the particular user system 1012. As discussed herein, permissions generally govern access to computing resources such as data objects, components, and other entities of a computing system, such as a unified data side panel GUI, a social networking system, and/or a CRM database system. "Permission sets" generally refer to groups of permissions that may be assigned to users of such a computing environment. For instance, the assignments of users and permission sets may be stored in one or more databases of System 1016. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1016 may provide on-demand database service to user systems 1012 using an MTS arrangement. By way of example, one tenant organization may be a company that employs a sales force where each salesperson uses system 1016 to manage their sales process. Thus, a user in such an organization may maintain contact data, leads data, customer follow-up data, performance data, goals and progress data, etc., all applicable to that user's personal sales process (e.g., in tenant data storage 1022). In this arrangement, a user may manage his or her sales efforts and cycles from a variety of devices, since relevant data and applications to interact with (e.g., access, view, modify, report, transmit, calculate, etc.) such data may be maintained and accessed by any user system 1012 having network access.

When implemented in an MTS arrangement, system 1016 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1016 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1016 may also maintain system-level data usable by multiple tenants or other data. Such system-level data may include industry reports, news, postings, and the like that are sharable between tenant organizations.

In some implementations, user systems 1012 may be client systems communicating with application servers 1050 to request and update system-level and tenant-level data from system 1016. By way of example, user systems 1012 may send one or more queries requesting data of a database maintained in tenant data storage 1022 and/or system data storage 1024. An application server 1050 of system 1016 may automatically generate one or more SQL statements (e.g., one or more SQL queries) that are designed to access the requested data. System data storage 1024 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI- TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 11A, 11B:
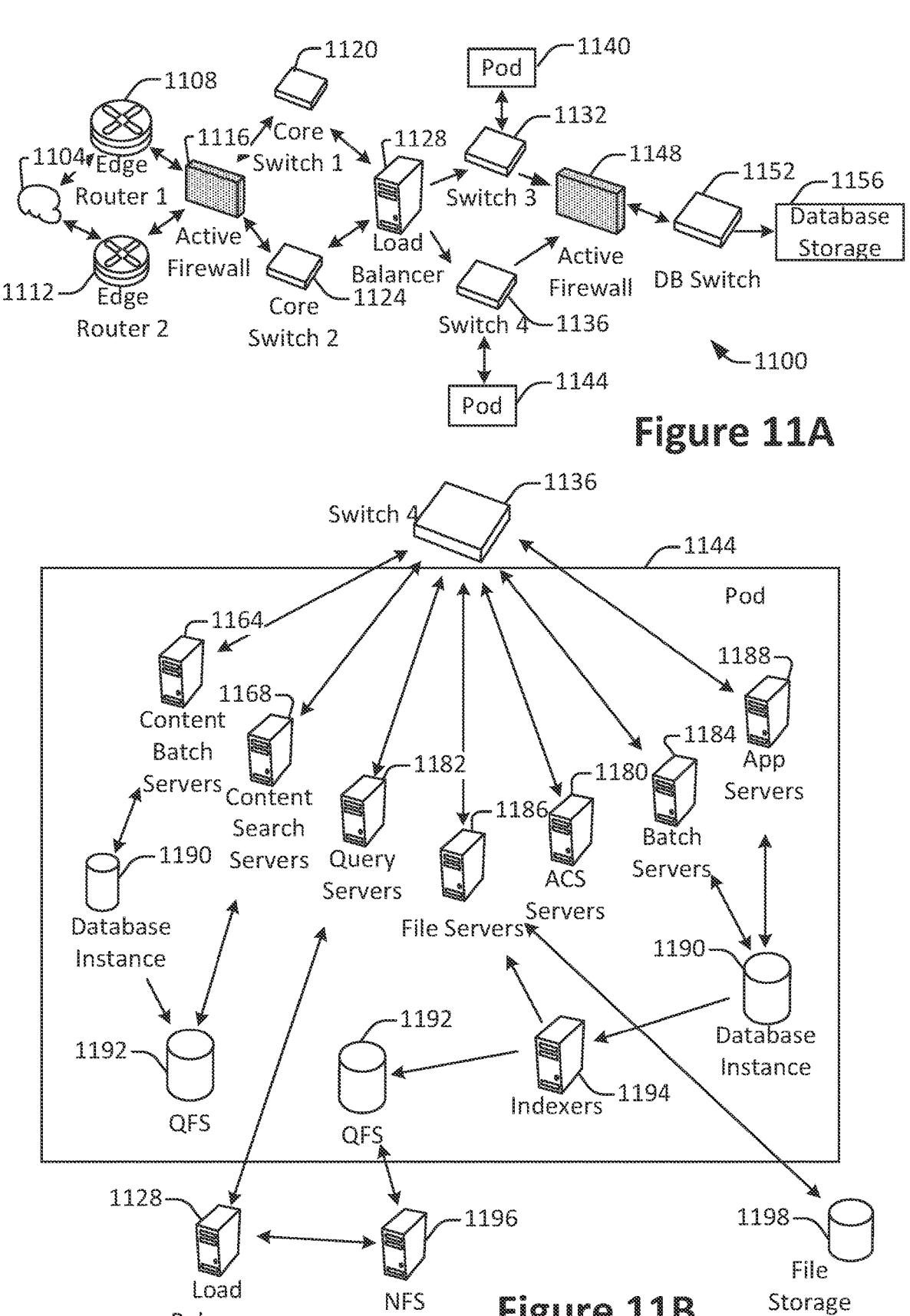
FIGS. 11A and 11B illustrate examples of a computing system, configured in accordance with one or more embodiments.

FIG. 11A shows a system diagram of an example of architectural components of an on-demand database service environment 1100, configured in accordance with some implementations. A client machine located in the cloud 1104 may communicate with the on-demand database service environment via one or more edge routers 1108 and 1112. A client machine may include any of the examples of user systems 1112 described above. The edge routers 1108 and 1112 may communicate with one or more core switches 1120 and 1124 via firewall 1116. The core switches may communicate with a load balancer 1128, which may distribute server load over different pods, such as the pods 1140 and 1144 by communication via pod switches 1132 and 1136. The pods 1140 and 1144, which may each include one or more servers and/or other computing resources, may perform data processing and other operations used to provide on-demand services. Components of the environment may communicate with a database storage 1156 via a database firewall 1148 and a database switch 1152.

Accessing an on-demand database service environment may involve communications transmitted among a variety of different components. The environment 1100 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 11A and 11B.

The cloud 1104 refers to any suitable data network or combination of data networks, which may include the Internet. Client machines located in the cloud 1104 may communicate with the on-demand database service environment 1100 to access services provided by the on-demand database service environment 1100. By way of example, client machines may access the on-demand database service environment 1100 to retrieve, store, edit, and/or process GUI information.

In some implementations, the edge routers 1108 and 1112 route packets between the cloud 1104 and other components of the on-demand database service environment 1100. The edge routers 1108 and 1112 may employ the Border Gateway Protocol (BGP). The edge routers 1108 and 1112 may maintain a table of IP networks or 'prefixes', which designate network reachability among autonomous systems on the internet.

In one or more implementations, the firewall 1116 may protect the inner components of the environment 1100 from internet traffic. The firewall 1116 may block, permit, or deny access to the inner components of the on-demand database service environment 1100 based upon a set of rules and/or other criteria. The firewall 1116 may act as one or more of a packet filter, an application gateway, a stateful filter, a proxy server, or any other type of firewall.

In some implementations, the core switches 1120 and 1124 may be high-capacity switches that transfer packets within the environment 1100. The core switches 1120 and 1124 may be configured as network bridges that quickly route data between different components within the on-demand database service environment. The use of two or more core switches 1120 and 1124 may provide redundancy and/or reduced latency.

In some implementations, communication between the pods 1140 and 1144 may be conducted via the pod switches 1132 and 1136. The pod switches 1132 and 1136 may facilitate communication between the pods 1140 and 1144 and client machines, for example via core switches 1120 and 1124. Also or alternatively, the pod switches 1132 and 1136 may facilitate communication between the pods 1140 and 1144 and the database storage 1156. The load balancer 1128 may distribute workload between the pods, which may assist in improving the use of resources, increasing throughput, reducing response times, and/or reducing overhead. The load balancer 1128 may include multilayer switches to analyze and forward traffic.

In some implementations, access to the database storage 1156 may be guarded by a database firewall 1148, which may act as a computer application firewall operating at the database application layer of a protocol stack. The database firewall 1148 may protect the database storage 1156 from application attacks such as structure query language (SQL) injection, database rootkits, and unauthorized information disclosure. The database firewall 1148 may include a host using one or more forms of reverse proxy services to proxy traffic before passing it to a gateway router and/or may inspect the contents of database traffic and block certain content or database requests. The database firewall 1148 may work on the SQL application level atop the TCP/IP stack, managing applications' connection to the database or SQL management interfaces as well as intercepting and enforcing packets traveling to or from a database network or application interface.

In some implementations, the database storage 1156 may be an on-demand database system shared by many different organizations. The on-demand database service may employ a single-tenant approach, a multi-tenant approach, a virtualized approach, or any other type of database approach. Communication with the database storage 1156 may be conducted via the database switch 1152. The database storage 1156 may include various software components for handling database queries. Accordingly, the database switch 1152 may direct database queries transmitted by other components of the environment (e.g., the pods 1140 and 1144) to the correct components within the database storage 1156.

FIG. 11B shows a system diagram further illustrating an example of architectural components of an on-demand database service environment, in accordance with some implementations. The pod 1144 may be used to render services to user(s) of the on-demand database service environment 1100. The pod 1144 may include one or more content batch servers 1164, content search servers 1168, query servers 1182, file servers 1186, access control system (ACS) servers 1180, batch servers 1184, and app servers 1188. Also, the pod 1144 may include database instances 1190, quick file systems (QFS) 1192, and indexers 1194. Some or all communication between the servers in the pod 1144 may be transmitted via the switch 1136.

In some implementations, the app servers 1188 may include a framework dedicated to the execution of procedures (e.g., programs, routines, scripts) for supporting the construction of applications provided by the on-demand database service environment 1100 via the pod 1144. One or more instances of the app server 1188 may be configured to execute all or a portion of the operations of the services described herein.

In some implementations, as discussed above, the pod 1144 may include one or more database instances 1190. A database instance 1190 may be configured as an MTS in which different organizations share access to the same database, using the techniques described above. Database information may be transmitted to the indexer 1194, which may provide an index of information available in the database 1190 to file servers 1186. The QFS 1192 or other suitable filesystem may serve as a rapid-access file system for storing and accessing information available within the pod 1144. The QFS 1192 may support volume management capabilities, allowing many disks to be grouped together into a file system. The QFS 1192 may communicate with the database instances 1190, content search servers 1168 and/or indexers 1194 to identify, retrieve, move, and/or update data stored in the network file systems (NFS) 1196 and/or other storage systems.

In some implementations, one or more query servers 1182 may communicate with the NFS 1196 to retrieve and/or update information stored outside of the pod 1144. The NFS 1196 may allow servers located in the pod 1144 to access information over a network in a manner similar to how local storage is accessed. Queries from the query servers 1122 may be transmitted to the NFS 1196 via the load balancer 1128, which may distribute resource requests over various resources available in the on-demand database service environment 1100. The NFS 1196 may also communicate with the QFS 1192 to update the information stored on the NFS 1196 and/or to provide information to the QFS 1192 for use by servers located within the pod 1144.

In some implementations, the content batch servers 1164 may handle requests internal to the pod 1144. These requests may be long-running and/or not tied to a particular customer, such as requests related to log mining, cleanup work, and maintenance tasks. The content search servers 1168 may provide query and indexer functions such as functions allowing users to search through content stored in the on-demand database service environment 1100. The file servers 1186 may manage requests for information stored in the file storage 1198, which may store information such as documents, images, basic large objects (BLOBs), etc. The query servers 1182 may be used to retrieve information from one or more file systems. For example, the query system 1182 may receive requests for information from the app servers 1188 and then transmit information queries to the NFS 1196 located outside the pod 1144. The ACS servers 1180 may control access to data, hardware resources, or software resources called upon to render services provided by the pod 1144. The batch servers 1184 may process batch jobs, which are used to run tasks at specified times. Thus, the batch servers 1184 may transmit instructions to other servers, such as the app servers 1188, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 12:
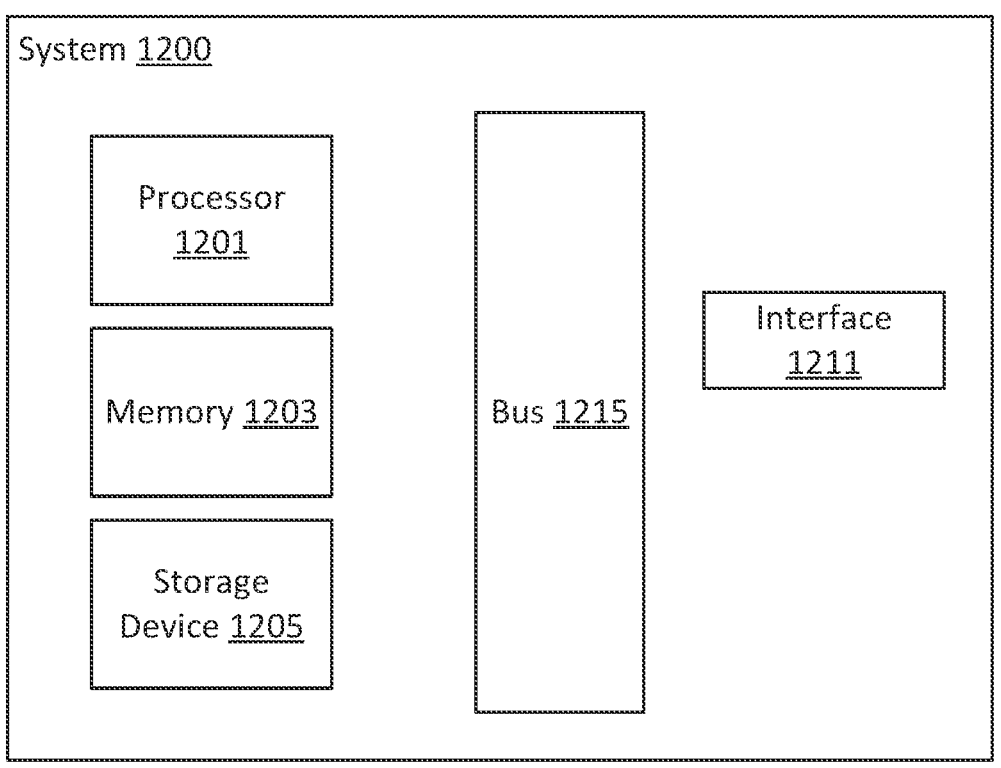
FIG. 12 illustrates an example of a computing device, configured in accordance with one or more embodiments.

FIG. 12 illustrates one example of a computing device. According to various embodiments, a system 1200 suitable for implementing embodiments described herein includes a processor 1201, a memory module 1203, a storage device 1205, an interface 1211, and a bus 1215 (e.g., a PCI bus or other interconnection fabric.) System 1200 may operate as variety of devices such as an application server, a database server, or any other device or service described herein. Although a particular configuration is described, a variety of alternative configurations are possible. The processor 1201 may perform operations such as those described herein. Instructions for performing such operations may be embodied in the memory 1203, on one or more non-transitory computer readable media, or on some other storage device. Various specially configured devices can also be used in place of or in addition to the processor 1201. The interface 1211 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

Figure 13:
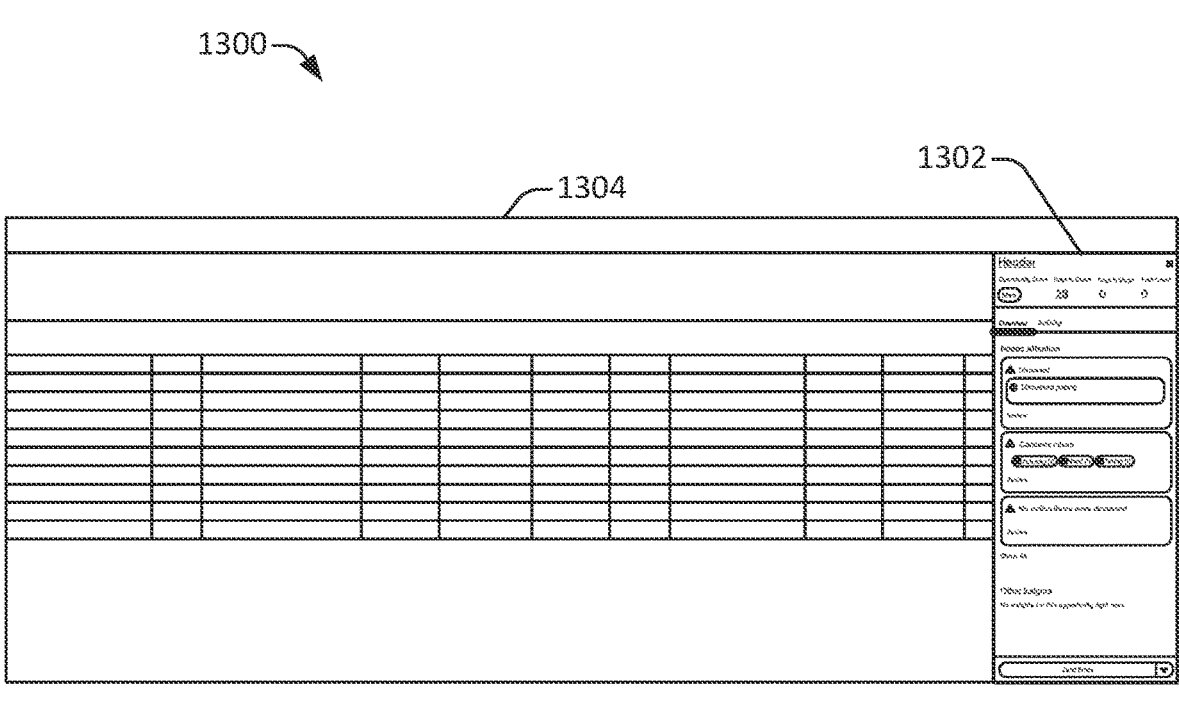
FIG. 13 illustrate a further examples of a graphical user interface, configured in accordance with one or more embodiments.

FIG. 13 illustrate a further examples of a graphical user interface, configured in accordance with one or more embodiments. FIG. 13 illustrates GUI 1300 showing sidebar 1302 within web application 1304. Sidebar 1302 may be a portion of the GUI configured to display insights, activities, and other data described herein. As shown in GUI 1300, sidebar 1302 may be located on a side portion of web application 1304 (e.g., the right side of web application 1304, as shown in FIG. 13).

The invention claimed is:

1. A system comprising:

an insight aggregator configured to receive a plurality of data elements from multiple heterogenous data sources, and further configured to generate insight data directed to insights associated with the plurality of data elements, the insight aggregator configuring the insight data such that it represents different formats of the plurality of data elements in a single format having a standardized data shape;

a record database, configured to store record data, wherein the record data comprises one or more documents, recordings, and video, and wherein the data received by the insight aggregator comprises the record data; and an insight processor configured to:

receive insight data directed to a plurality of insights, wherein the plurality of insights comprises an opportunity insight;

categorize the insight data based on metadata associated with the plurality of insights;

determine, dynamically, a presentation order for the plurality of insights based, at least in part, on a plurality of priorities determined based on the categorizing; and communicate the insight data and the presentation order to a web application for dynamic display in a unified graphical user interface, wherein the communicated insight data has a standardized format and standardized graphical shape capable of being dynamically displayed in the unified graphical interface that is integrated within a graphical user interface of a web application and in accordance with the dynamically determined presentation order, wherein the presentation order is determined based on an order rule.

2. The system of claim 1, wherein the insight data is generated at least partially from the record data.

3. The system of claim 1, wherein the opportunity insight is determined from the record data.

4. The system of claim 3, wherein the presentation order is determined based on the opportunity insight.

5. The system of claim 1, wherein the plurality of data elements comprises a plurality of data types.

6. The system of claim 5, wherein the insight aggregator is configured to convert each of the plurality of data types to a standardized data format.

7. The system of claim 6, wherein the insight data is generated based on data converted to the standardized data format.

8. A method comprising:

a record database, configured to store record data, wherein the record data comprises one or more documents, recordings, and video, and wherein the data received by the an insight aggregator comprises the record data;

receiving a plurality of data elements from multiple heterogenous data sources;

generating insight data directed to insights associated with the plurality of data elements, the insight data representing different formats of the plurality of data elements in a single format having a standardized data shape;

wherein a plurality of insights comprises an opportunity insight;

categorize the insight data based on metadata associated with the plurality of insights;

determining, dynamically, a presentation order for the plurality of insights based, at least in part, on a plurality of priorities determined based on the categorizing; and communicating the insight data and the presentation order to a web application for dynamic display in a unified graphical user interface, wherein the communicated insight data has a standardized format and standardized graphical shape capable of being dynamically displayed in the unified graphical interface that is integrated within a graphical user interface of a web application and in accordance with the dynamically determined presentation order, wherein the presentation order is determined based on an order rule.

9. The method of claim 8, wherein the insight data is generated at least partially from the record data.

10. The method of claim 8, wherein the opportunity insight is determined from the record data.

11. The method of claim 10, wherein the presentation order is determined based on the opportunity insight.

12. The method of claim 8, wherein the plurality of data elements comprises a plurality of data types.

13. The method of claim 12, further comprising:

converting each of the plurality of data types to a standardized data format.

14. The method of claim 13, wherein the insight data is generated based on data converted to the standardized data format.

* * * * *